UNITED STATES PATENT OFFICE.

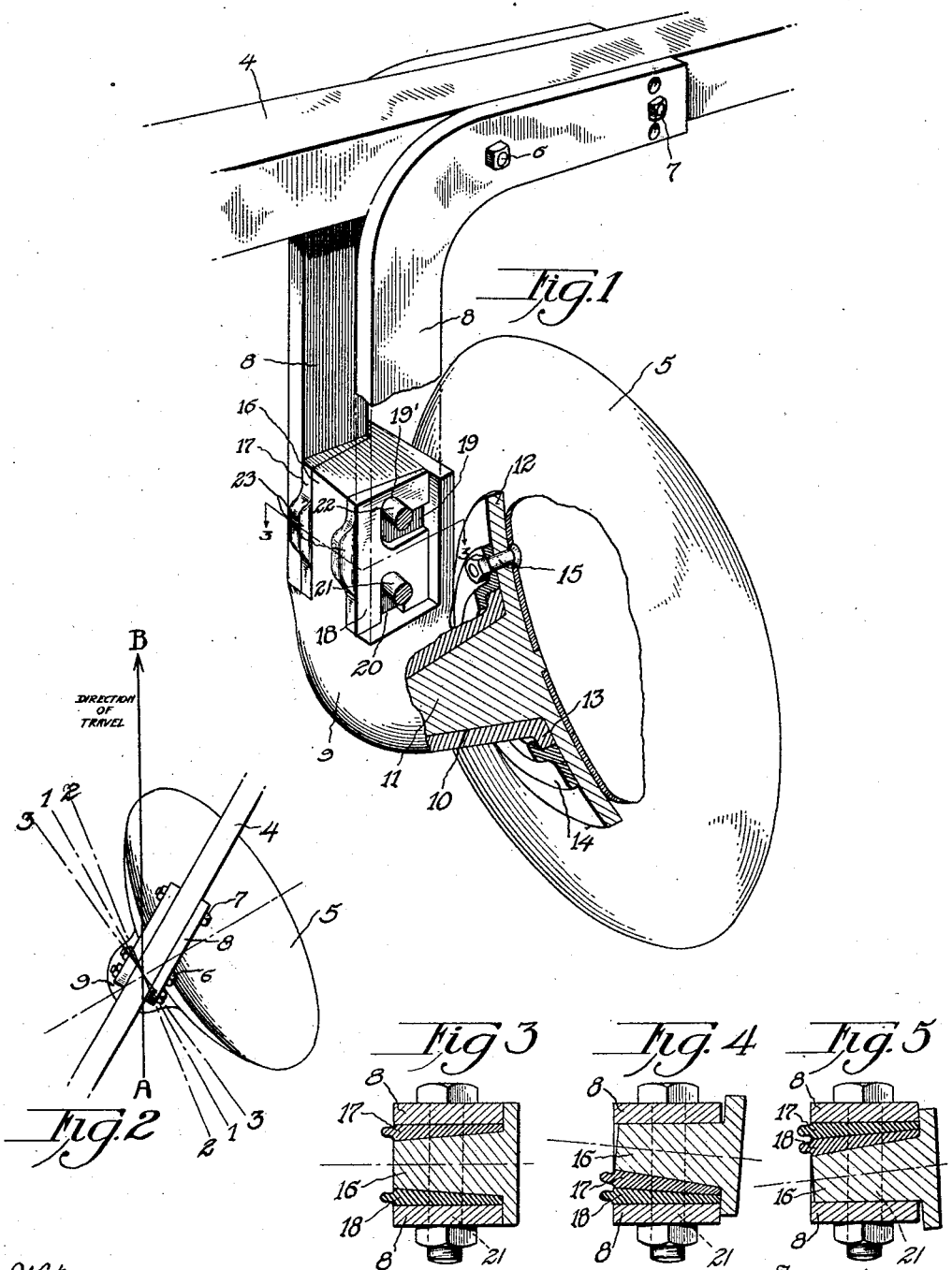

DUNY A. SCHUTT, OF JANESVILLE, WISCONSIN, ASSIGNOR TO GENERAL MOTORS CORPORATION, OF DETROIT, MICHIGAN, A CORPORATION OF DELAWARE.

DISK-ADJUSTING MECHANISM FOR AGRICULTURAL IMPLEMENTS.

1,417,207.   Specification of Letters Patent.   Patented May 23, 1922.

Application filed March 7, 1921. Serial No. 450,307.

*To all whom it may concern:*

Be it known that I, DUNY A. SCHUTT, a citizen of the United States, and a resident of Janesville, county of Rock, and State of Wisconsin, have invented certain new and useful Improvements in Disk-Adjusting Mechanism for Agricultural Implements, of which the following is a full, clear, concise, and exact description, such as will enable others skilled in the art to which the invention relates to make and use the same, reference being made therein to the accompanying drawings, which form a part of this specification.

My invention relates to agricultural implements of the general class or type wherein a rotating disk is employed for turning furrows, or otherwise working the soil, as is the case in disk plows, disk cultivators, disk harrows and like devices; and the principal object of my invention is to provide improved means for adjusting the angularity of the various disks of the implement relative to the line of travel thereof and relative to the supporting means for the disks, to thereby vary the action of the disks upon the soil and secure a proper turning of furrows, a proper working of the soil, and a proper action of the disks when the implement is in use.

Heretofore in agricultural implements in which the soil is operated upon by disks free to rotate relative to suitable supporting devices the adjustment of the disks has been accomplished by means which, while capable to a certain extent of varying the position of and thus the action of the disks, has been of such a character that the proper adjustment of the disks could not be determined without actual operation of the machine; as there has been nothing in the nature of means to definitely fix the positions of the disks to indicate when they are properly adjusted. Furthermore, adjusting means heretofore in use has been of such a character that in the case of implements having a plurality of disks there is nothing to insure the adjustment of the several separate disks properly relative to one another, and properly relative to the work which they are to perform; from which it follows that one disk may be properly adjusted and another not properly adjusted, and that it will be necessary to actually use the implement and adjust the various disks thereof separately and by trial, in order to finally attain even an approximately correct action of the implement.

As distinguished from above my invention contemplates adjusting mechanisms for the several separate disks characterized by the fact that the positions assumed by the disks are definite and distinct, and determined by the mechanical features of the adjusting mechanism; so that each individual disk can be made to occupy a limited number only of angular positions: which number, however, is sufficient for all ordinary uses of the implement and provides a sufficient range of adjustment to secure its proper operation under ordinary conditions of use. In an agricultural implement the disks of which are equipped with such an adjusting device each disk must necessarily be properly adjusted, as it can be made to assume a limited number of positions only; so that when all the disks are positioned in accordance with a definite rule furnished by the maker of the implement the same will be properly adjusted as a whole.

The drawing accompanying and forming a part of this specification illustrates one of various embodiments of my invention, although it will be appreciated that the same may be embodied in many other specific forms: and that my invention includes all such variations and modifications of the particular embodiment thereof illustrated and herein described as come within the scope of the concluding claims, wherein the distinguishing features of my invention are particularly pointed out.

Referring now to the drawing wherein the preferred embodiment of my invention is illustrated:

Figure 1 is a fragmentary view showing my invention for the most part in perspective, certain parts thereof being broken away, and others shown in section to make the understanding thereof more clear.

Figure 2 is a similar fragmentary plan view upon a smaller scale illustrating the operation of my invention, and Figures 3, 4 and 5 are sectional views upon a transverse substantially horizontal plane indicated by the lines 3, 3, Figure 1, showing the manner in which three separate and distinct adjustments may be secured in the embodiment of my invention herein disclosed.

Referring now to the drawing, the reference numeral 4 designates a disk supporting frame or bar extending fore and aft of a gang plow in which the furrows are turned by a plurality of disks, and which bar serves to support one, two or more disks according to the size of the plow and as is usual in gang plows. This supporting or frame bar is ordinarily arranged diagonally relative to the line of travel of the plow (which is indicated by the line A—B, Figure 2 of the drawing); the disks being thus located one behind the other, and offset each the width of a furrow from the next adjacent disk, as is usual in gang plows. It will, however, be unnecessary to show a complete gang plow, as my invention relates only to the adjustment of the separate disks thereof; and it will be appreciated that the adjusting mechanism illustrated and herein described as applied to a gang plow is equally capable of use for adjusting the disks of harrows, cultivators, and other types of disk implements for tilling the soil.

The reference numeral 5 designates the rotating disk which acts upon the soil, and the adjustment of which is provided for by my invention; said disk being supported from the frame bar 4 by means of a suitable supporting member or device which, in the embodiment of my invention illustrated, comprises two right-angular supporting brackets secured one upon each side of the frame bar by means of bolts 6, 7 and having depending arms 8—8 between the lower ends of which a suitable disk supporting member or bracket 9 is secured, and which bracket in turn serves to support the disk in such a manner that the same may rotate freely due to the action of the ground thereupon as the implement is drawn forward. The disk supporting bracket 9 is provided with a bearing recess 10 shown as conical in form and into which a gudgeon or trunnion 11 of like form extends, and within which the same is rotatable; this trunnion being formed integral with a disk supporting plate 12 which serves as the immediate support for the disk. The bracket 9 is provided adjacent its free forward end with a flange 13 which surrounds the opening of the recess 10; and the reference numeral 14 designates a flanged holding ring the inner edge of which overlies the flange 13. The disk 5 and ring 14 are held in place upon opposite sides of the supporting plate 12 by means of a plurality of properly spaced bolts 15 extending through holes in said parts and serving to hold them together and the disk and its supporting plate 12 properly assembled relative to the supporting bracket 9 whereby the disk and associated parts are carried. This disk structure and the manner of supporting the same from the frame bar, and the means for adjusting the supporting bracket by the provision of a plurality of holes at the free forward ends thereof, is not claimed specifically in this present application; as the same is illustrated and described and claimed in an application for patent filed by Alvaro S. Krotz, upon the 8th day of December, 1920, Serial No. 429,205, relating to improvements in power lift plows.

My invention provides adjusting mechanism whereby the disk supporting member or bracket 9 may be angularly adjusted about a substantially vertical axis so that a plane including said axis and moving therewith during the adjustment may be made to assume either one of the three positions indicated by the lines 1—1, 2—2, or 3—3, Figure 2, to thereby vary the position of the disk and the angle of a plane including its cutting edge relative to the straight-ahead movement of the implement and relative to the ground operated upon; to thereby secure, especially in the case of disk plows, a proper action of the disk upon the ground, a proper turning of the furrows and a proper following of the implement as a whole after the team, tractor, or other hauling agency. The element whereby the disk is supported is thus movable relative to the structure whereby the same is supported from the frame bar, and the extreme positions of said disk supporting device and of the disk carried thereby are determined by engagement between parts or surfaces of said device and the arms, bracket, or other structure which supports the disk from the frame bar; so that the two extreme positions of the disk are invariable and are determined by engagement between the parts.

In the form of my invention illustrated the disk supporting bracket 9 is provided with an upwardly extending portion 16 which is wedge-shaped in form and has its narrowest edge rearward, and which portion lies in between the depending arms 8—8 of the right-angular supporting brackets, but which portion 16 is narrower at its widest part than the distance between said arms; and either one of the vertical side walls of the said wedge-shaped portion may be forced against the adjacent inner wall of a depending arm 8 and held in the fixed position thus assumed by means of a suitable holding member such as is provided by the wedge members 17, 18, as indicated in Figures 3, 4 and 5 of the drawing, to thereby position the disk supporting bracket and disk in one or the other of the two extreme positions determined by engagement between the parts as herein explained.

The wedge members 17, 18 are alike and are provided each with a slot 19 extending inward from its thin front edge and terminating in an upward extension 19', and with an upwardly extending slot 20; so that each wedge may be put in place by moving the same in between the parts and downward and forward to cause the slot 20 to engage the lower fastening bolt 21 whereby the parts are secured together, and then swinging the same inward as the slot 19 moves along the upper fastening bolt 22; whereupon and upon a slight downward movement of the wedge the vertical extension 19' of the slot 19 receives the upper fastening bolt and the wedge itself is held in position irrespective of whether the bolts 20, 21 are tight or not. These fastening bolts as will be appreciated are for the purpose of clamping the vertically extending portion 16, the arms 8—8 and the adjusting wedges 17, 18, together after the wedges have been properly placed to secure the required adjustment of the disk.

Referring now to Figures 3, 4 and 5, it will be appreciated that the combined thickness of the two wedges 17, 18 is such that the two of them take up the space between the depending supporting arms 8—8 and the upwardly extending wedge-shaped part 16 of the disk supporting bracket 9. It therefore follows that when the wedges are placed one upon each side of the part 16 as in Figure 3 the bracket 9 will be held in its central position, and the disk itself in its middle position indicated by the line 1—1, Figure 2.

Referring now to Figure 4, it will be seen that if both wedges are placed upon one side of the portion 16 the supporting bracket 9 will be made to assume a second position, and the disk to assume the one of its two extreme positions indicated by the lines 2, 2, Figure 2; whereas if the two wedges are placed upon the other side of the part 16 as indicated in Figure 5 the supporting bracket 9 will be made to assume a third angular position, and the disk to assume the other extreme position, indicated by the line 3—3, Figure 2, opposite the position which it assumed under the conditions illustrated in Figure 4.

It will be appreciated that the wedging means or device above referred to provides for the adjustment of the parts into three separate and distinct positions, each determined by the form of the parts and their relation to and engagement with one another; and that it is impossible to place and fasten the disk in any intermediate position, as the three adjustments are all that can be secured in the adjusting mechanism as a whole.

It therefore follows that with suitable instructions as to the arrangement of the wedges the disks may be properly adjusted for various kinds of work to be done, and that they cannot be adjusted in wrong positions except as the result of a total neglect of the user of the implement to follow directions; as all that is necessary is that the wedges be placed upon opposite sides of the vertical portion 16 of the disk carrying bracket, or both upon one or the other side of the said vertical portion, and the bolts 21, 22 tightened; although it will be appreciated that the proper angular adjustment of the parts will be secured even though the bolts be not properly tightened, as the form and arrangement of the slots in the wedges is such as to prevent them from falling out of place even if the bolts are not sufficiently tightened.

Finally, and still referring to Figures 3, 4 and 5, it will be appreciated that if a range of adjustment into two extreme positions is sufficient for the service required of the implement it will be necessary to use but a single wedge, as the two like wedges 16, 17 form in effect a single wedge element so far as concerns the adjustment of the parts into the two extreme positions shown in Figures 4 and 5 and indicated by the lines 2—2 and 3—3, Figure 2; and that if the two adjustments here contemplated are sufficient, then the two wedges can be made integral. The wedge members are provided with handle portions 23 extending from their thickest or rear edges and whereby they may be conveniently removed and replaced when it becomes necessary to adjust the disks.

Having thus described and explained my invention, I claim and desire to secure by Letters Patent:

1. In disk supporting mechanism of the class described, a supporting member; a disk supporting bracket carried by said supporting member and capable of assuming three definite and predetermined positions and only three such positions relative thereto; a disk carried by said disk supporting bracket and rotatable relative thereto; and a plurality of wedges adapted when in place to hold said disk supporting bracket in either one of the three definite and fixed positions aforesaid relative to said supporting member.

2. In disk supporting mechanism of the class described, two supporting members spaced apart from one another; a disk supporting bracket having a portion lying between said supporting members, and which is loose between said members; wedge mechanism adapted to hold said bracket portion in a plurality of fixed and determined positions between and relative to said supporting members; fastening means adapted to hold said parts together; and a rotating disk carried by said disk supporting bracket and rotatable relative thereto.

3. In disk supporting mechanism of the class described, a suitable supporting bar; two supporting members depending from said bar and spaced apart from one another;

a disk supporting bracket having a portion lying between the free lower ends of said supporting members and loose between said members; wedge mechanism adapted to hold said bracket portion in a plurality of fixed and determined positions between and relative to said supporting members; fastening means adapted to hold said parts together; and a rotating disk carried by said disk supporting bracket and rotatable relative thereto.

4. In disk supporting mechanism of the class described, a suitable supporting bar; two disk supporting arms depending from said bar and spaced apart from one another; a disk supporting bracket having an upwardly extending wedge-shaped portion lying between said depending arms; wedge mechanism adapted to fill the space between said upwardly extending bracket portion and one or another of said depending arms; a bolt extending through said arms and said upwardly extending portion and adapted to fasten said parts together; and a disk carried by said supporting bracket and rotatable relative thereto.

5. In disk supporting mechanism of the class described, a suitable supporting bar; two supporting arms depending from said bar and spaced apart from one another; a disk supporting bracket having an upwardly extending wedge-shaped portion lying in between the lower ends of said arms, and which portion is of less thickness than the space between said arms; two wedge members of such dimensions as to together fill the space between the said upwardly extending portion and said depending arms; a fastening member whereby said parts are secured together; and a disk carried by said disk supporting bracket and rotatable relative thereto.

6. In adjustable disk supporting mechanism of the class described, an adjusting wedge having a slot extending inward from its narrower or front edge, and then upward, and a second slot extending upward from its lower tapered end.

7. In adjustable disk supporting mechanism of the class described, an adjusting wedge having a slot extending inward and upward from its thinner front edge; a second slot extending upward from its tapered lower end; and a handle at its thicker rear edge and whereby the wedge may be manipulated.

8. In adjustable disk supporting mechanism of the class described, an adjusting wedge having a slot extending inward from its narrower or front edge, and then upward, and a second slot extending upward from its lower tapered end; and two fastening bolts so located as to lie within the inner ends of said slots when the parts are properly adjusted.

9. In a disk supporting device of the class described, a supporting member; a disk supporting bracket supported by said supporting member and having two portions which engage co-operating parts of said supporting member when said bracket is in two extreme positions; wedging means for holding said disk supporting bracket in one or the other of the two extreme positions aforesaid with one of the two engaging portions of said bracket in direct contact with a co-operating part of said supporting member; means independent of said wedging means for fastening said parts together; and a disk carried by said bracket and rotatable relative thereto.

10. In a disk supporting device of the class described, a supporting member; a disk supporting bracket supported by said supporting member and movable relative thereto; co-operating stopping elements adapted to engage directly with one another and determine the extreme positions of said supporting member; a wedge device adapted to hold said supporting member in either one of the two extreme positions aforesaid; means for fastening said parts together; and a disk carried by said disk supporting bracket and rotatable relative thereto.

11. In an agricultural implement of the class described, a supporting beam; a disk supporting bracket carried by said beam; means for adjusting said bracket relative to said beam and about a substantially horizontal axis; a disk supporting member carried by said bracket; means independent of said first mentioned adjusting means for adjusting said disk supporting bracket about a substantially vertical axis; and a rotating disk carried by said disk supporting bracket.

In testimony whereof I affix my signature.

DUNY A. SCHUTT.